United States Patent
Sedky et al.

(10) Patent No.: US 7,554,682 B2
(45) Date of Patent: Jun. 30, 2009

(54) PRINTER FILTER CONFIGURATION

(75) Inventors: Khaled S. Sedky, Sammamish, WA (US); Adina M. Trufinescu, Redmond, WA (US); Feng Yue, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 11/024,049

(22) Filed: Dec. 28, 2004

(65) Prior Publication Data

US 2006/0139673 A1    Jun. 29, 2006

(51) Int. Cl.
    *G06F 3/12*    (2006.01)
(52) U.S. Cl. .................... 358/1.13; 358/1.1; 358/1.9; 358/1.15; 358/1.16; 358/537; 710/14; 710/15; 710/31; 710/33; 703/27
(58) Field of Classification Search .............. 358/1.9, 358/1.13, 1.15, 1.18; 703/27; 710/31, 33
    See application file for complete search history.

(56) References Cited

U.S. PATENT DOCUMENTS

| | | | | |
|---|---|---|---|---|
| 5,220,674 A | * | 6/1993 | Morgan et al. | 709/223 |
| 5,604,887 A | * | 2/1997 | Naidu et al. | 703/27 |
| 5,812,767 A | * | 9/1998 | Desai et al. | 709/250 |
| 5,845,058 A | * | 12/1998 | Shaw et al. | 358/1.15 |
| 5,933,584 A | * | 8/1999 | Maniwa | 358/1.15 |
| 6,202,147 B1 | * | 3/2001 | Slaughter et al. | 713/1 |
| 6,222,638 B1 | * | 4/2001 | Otala | 358/1.18 |
| 6,476,927 B1 | * | 11/2002 | Schwarz, Jr. | 358/1.15 |
| 6,661,526 B1 | * | 12/2003 | Daly et al. | 358/1.13 |
| 6,683,696 B1 | * | 1/2004 | Urie et al. | 358/1.15 |
| 6,718,550 B1 | * | 4/2004 | Lim et al. | 710/310 |
| 6,795,089 B2 | * | 9/2004 | Rajarajan et al. | 345/629 |
| 7,064,856 B2 | * | 6/2006 | Fu et al. | 358/1.18 |
| 7,136,941 B2 | * | 11/2006 | Nguyen et al. | 710/15 |
| 7,423,769 B2 | * | 9/2008 | Yu | 358/1.1 |

* cited by examiner

*Primary Examiner*—King Y Poon
*Assistant Examiner*—Richard Z Zhu
(74) *Attorney, Agent, or Firm*—Lee & Hayes, PLLC (57) ABSTRACT

A flexible printing subsystem is enabled with a printer filter pipeline. A configurable and arbitrary number of printer filters forming a printer filter pipeline are applied to files that are to be printed. In a described implementation, the printer filter pipeline may implement enhancement features and conversion functions as determined by the individual printer filters forming the printer filter pipeline. The printer filter pipeline is established in accordance with a printer filter configuration file. The printer filter configuration file stipulates a printer filter order and includes a printer filter entry associated with each printer filter to be part of the printer filter pipeline. Each printer filter entry identifies the associated printer filter by name and enumerates the interfaces thereof. Printer filters may be adjacently linked in a printer filter pipeline when their mating interfaces match.

16 Claims, 7 Drawing Sheets

PRINTER FILTER CONFIGURATION

TECHNICAL FIELD

This disclosure relates in general to printing and in particular, by way of example but not limitation, to enabling a flexible printer pipeline in a printer subsystem in which an arbitrary number of as well as differing types of printer filters may be utilized.

BACKGROUND

Although the paperless office has been contemplated for decades, it is not yet a reality in most environments. Moreover, a hardcopy version of certain kinds of documents and artistic creations may always be desirable. Hence, printing is an important function provided by computing devices.

Figure 1:
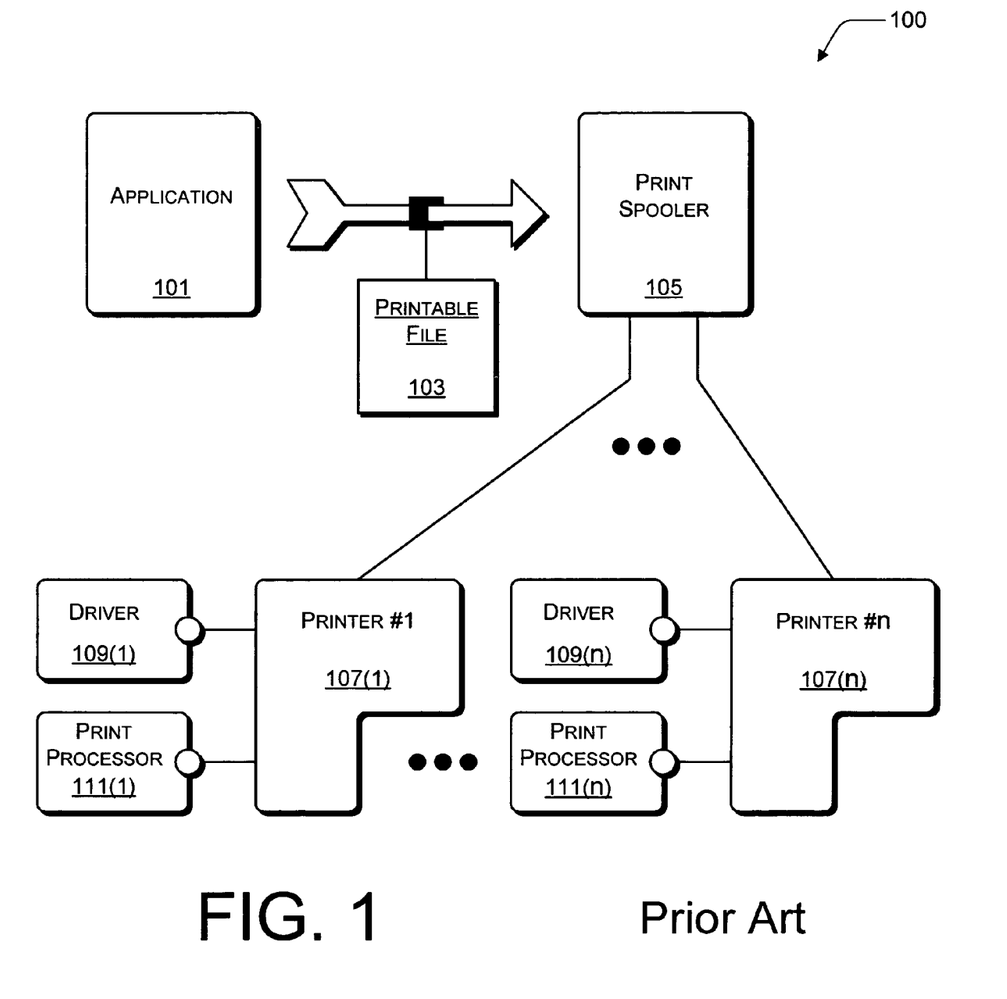
FIG. 1 is an example of an existing printing scenario.

FIG. 1 is an example of an existing printing scenario 100. As illustrated, existing printing scenario 100 includes an application 101, a print spooler 105, and "n" printers 107(1 . . . n). Application 101 may be, for example, a word processing program. Application 101 creates a printable file 103. This creation of printable file 103 may possibly be effectuated in conjunction with a graphics subsystem, such as by application 101 calling an application programming interface (API) of the graphics subsystem. Printable file 103 is provided (e.g., as a stream of bits) to print spooler 105. Print spooler 105 is a component that is capable of managing one or more printers 107 and orchestrating print jobs with printers 107.

Each printer 107 is associated with a driver 109 and a print processor 111. As illustrated, printer #1 107(1) is associated with driver 109(1) and print processor 111(1), and printer #n 107(n) is associated with driver 109(n) and print processor 111(n). Print processors 111 are capable of providing printing enhancements such as transparences, watermarks, binding layouts, and n-up printing. Drivers 109 are responsible for converting printable file 103 from a computer language to a printer language.

Print processor 111 operates on printable file 103 to produce an enhanced printable file 103. After the enhancements are provided by print processor 111, driver 109 operates on the enhanced printable file 103 to create a converted (and enhanced) printable file 103. The converted printable file 103 can then be printed by a printer 107 that is associated with the print processor 111 and driver 109.

Each printer 107, or more specifically each printer queue in print spooler 105, has no more than a single associated driver 109 and a single associated print processor 111. Each particular driver 109 and print processor 111 pair are specifically designed to work together. Consequently, drivers 109 and print processors 111 cannot be freely interchanged with one another. Print spoolers 105 are designed to utilize at most one driver 109 and one print processor 111 per printer 107. Consequently, a new enhancement feature or conversion function can be added only by installing a completely new print processor 111 or driver 109, respectively, which replaces a previous one.

In short, existing printing subsystems are designed to utilize one driver 109 and one print processor 111 for any given printer 107. The order in which they operate is predefined with print processor 111 operating prior to driver 109. Both the input and the output interfaces for drivers 109 and print processors 111 are fixed. Finally, the data types with which drivers 109 and print processors 111 interact are also fixed.

Accordingly, there is a need for general schemes and/or techniques that can facilitate printing flexibility and/or adjustability across a range of printing features and functions.

SUMMARY

A flexible printing subsystem is enabled with a printer filter pipeline. A configurable and arbitrary number of printer filters forming a printer filter pipeline are applied to files that are to be printed. In a described implementation, the printer filter pipeline may implement enhancement features and conversion functions as determined by the individual printer filters forming the printer filter pipeline. The printer filter pipeline is established in accordance with a printer filter configuration file. The printer filter configuration file stipulates a printer filter order and includes a printer filter entry associated with each printer filter to be part of the printer filter pipeline. Each printer filter entry identifies the associated printer filter by name and enumerates the interfaces thereof. Printer filters may be adjacently linked in a printer filter pipeline when their mating interfaces match.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction to Printer Filter Pipelines

Figure 2:
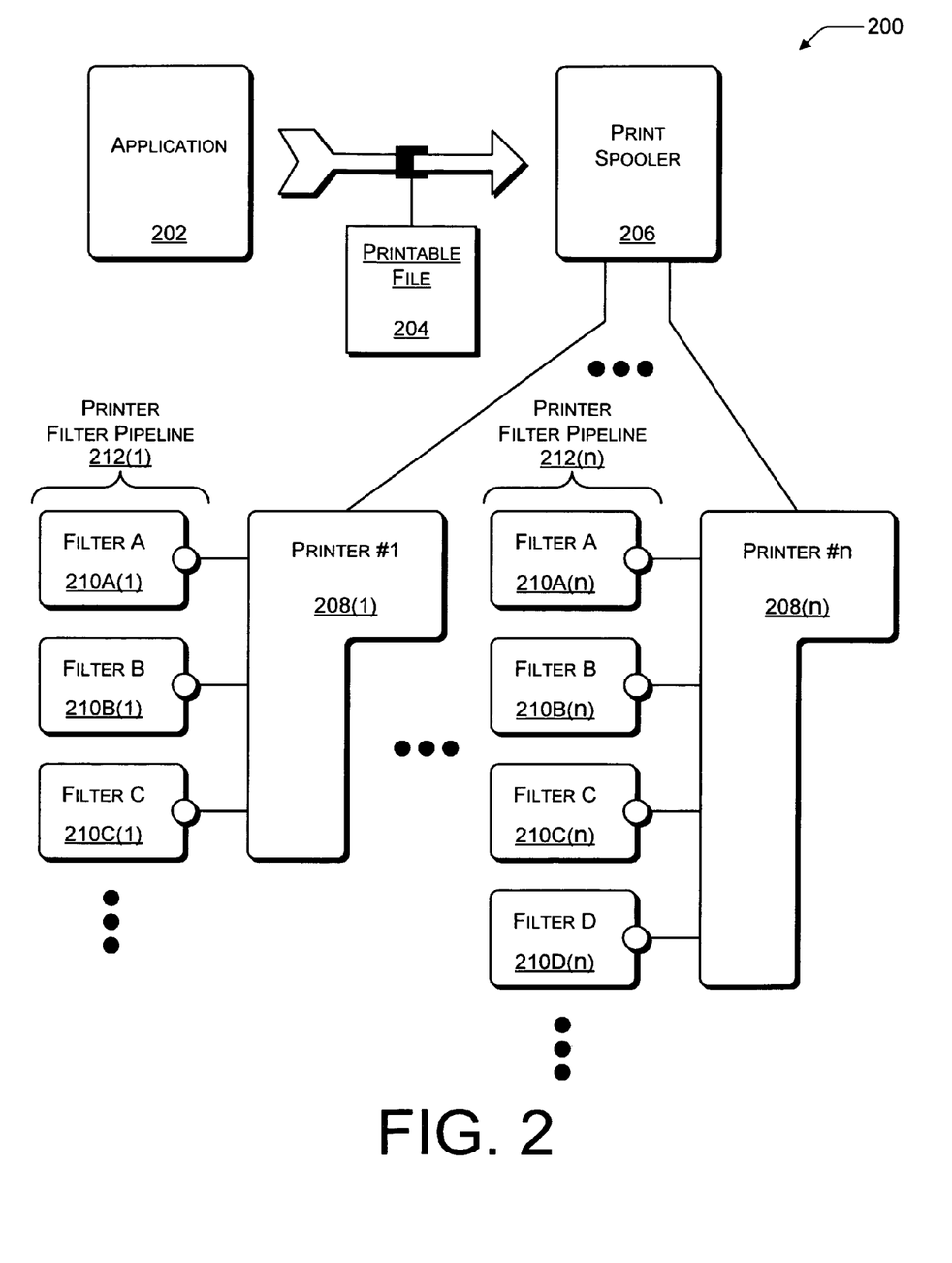
FIG. 2 is an example of a flexible printing scenario having a printer filter pipeline.

FIG. 2 is an example of a flexible printing scenario 200 having a printer filter pipeline 212. In a described implementation, each printer filter pipeline 212 may be comprised of an arbitrary and configurable number of printer filters 210. Each printer filter 210 may implement one or more conversion functions and/or an enhancement features. Printer filters 210 may be interconnected to form a printer filter pipeline 212 in different orders and in varying numbers. The data types exchanged between printer filters 210 are also flexible.

As illustrated, flexible printing scenario 200 includes an application 202, a print spooler 206, and "n" printers 208(1 . . . n), where "n" is an integer equal to one or greater. Application 202 may be, for example, a word processor, a spreadsheet program, an email client, a web browser, an artistic and/or entertainment program, an installation program, some combination thereof, and so forth. Printers 208 may be any type of printer, including professional or consumer printers, ink jet or laser printers, networked or directly-connected printers, and so forth.

Each printer 208 corresponds to a respective printer filter pipeline 212 and is associated with multiple printer filters 210 thereof. As illustrated, printer #1 208(1) corresponds to printer filter pipeline 212(1) and is associated with filter A 210A(1), filter B 210B(1), filter C 210C(1), ... and possibly more such filters 210 as indicated by the ellipses. Printer #n 208(n) corresponds to printer filter pipeline 212(n) and is associated with filter A 210A(n), filter B 210B(n), filter C 210C(n), filter D 210D(n) ... and possibly more such filters 210. As is described further herein below with particular reference to FIG. 3, individual printer filters 210 are capable of providing at least one printing enhancement feature and/or are responsible for at least partially converting printable file 204 into a printer-compatible language from a computer-compatible format.

In operation, application 202 creates or otherwise has access to a printable file 204. Printable file 204 is provided (e.g., as a stream of bits) to print spooler 206 after a user activates a print command through application 202 (or using another software construct). By way of example only, when application 202 provides printable file 204 to print spooler 206, printable file 204 may be in a computer-compatible format such as an enhanced metafile format (EMF). Print spooler 206 accepts printable file 204 from application 202 to effectuate the printing process.

It should be understood that application 202 may not directly provide printable file 204 to print spooler 206 and that print spooler 206 likewise may not directly accept printable file 204 from application 202. There may be one or more intervening system components. For example, application 202 may directly provide printable file 204 to a graphics subsystem (not shown), which may modify printable file 204 and then provide (modified) printable file 204 to print spooler 206. For instance, application 202 may call an API of the graphics subsystem. Regardless, application 202 effectively provides printable file 204 directly or indirectly to print spooler 206.

In a described implementation, print spooler 206 is a component that is capable of managing one or more printers 208 and orchestrating print jobs with printers 208. More specifically, print spooler 206 is capable of utilizing at least one designated printer filter pipeline 212 when orchestrating print jobs. Print spooler 206 is adapted to apply printable file 204 to the print filters 210 of the designated corresponding printer filter pipeline 212. After printable file 204 is passed through printer filters 210 of the corresponding printer filter pipeline 212 for conversion and possible enhancement, printable file 204 comprises a printer-compatible file that may be consumed for printing by printer 208.

Differently-formatted versions of printable file 204 may concurrently exist within a scenario or device. Differently-formatted versions of printable file 204 may arise, for example, as printable file 204 is applied to and traverses printer filter pipeline 212. For instance, there may simultaneously be a (e.g., residual) computer-language compatible printable file 204 and a printer-language compatible printable file 204, as well as any intermediate versions. Also, a copy of printable file 204 (in any format) may be stored when an original is forwarded from application 202 to print spooler 206, for example, or a copy of printable file 204 (in any format) may be forwarded when an original is stored.

Application 202 and printers 208 may optionally be specially designed and/or modified to operate in conjunction with a printing subsystem that is capable of utilizing a printer filter pipeline 212. For example, an application 202 may add a printer filter 210 to a printer filter pipeline 212 and/or rely on features or functions of a particular printer filter 210 or a combination of printer filters 210. Also, a printer 208 may be capable of following an instruction that results from one or more printer filters 210. Applications 202 and printers 208 may alternatively entail other special designs or modifications to improve and/or facilitate their operation in conjunction with printer filter pipelines 212.

Printer Filter Configuration Implementtion Examples

Figure 3:
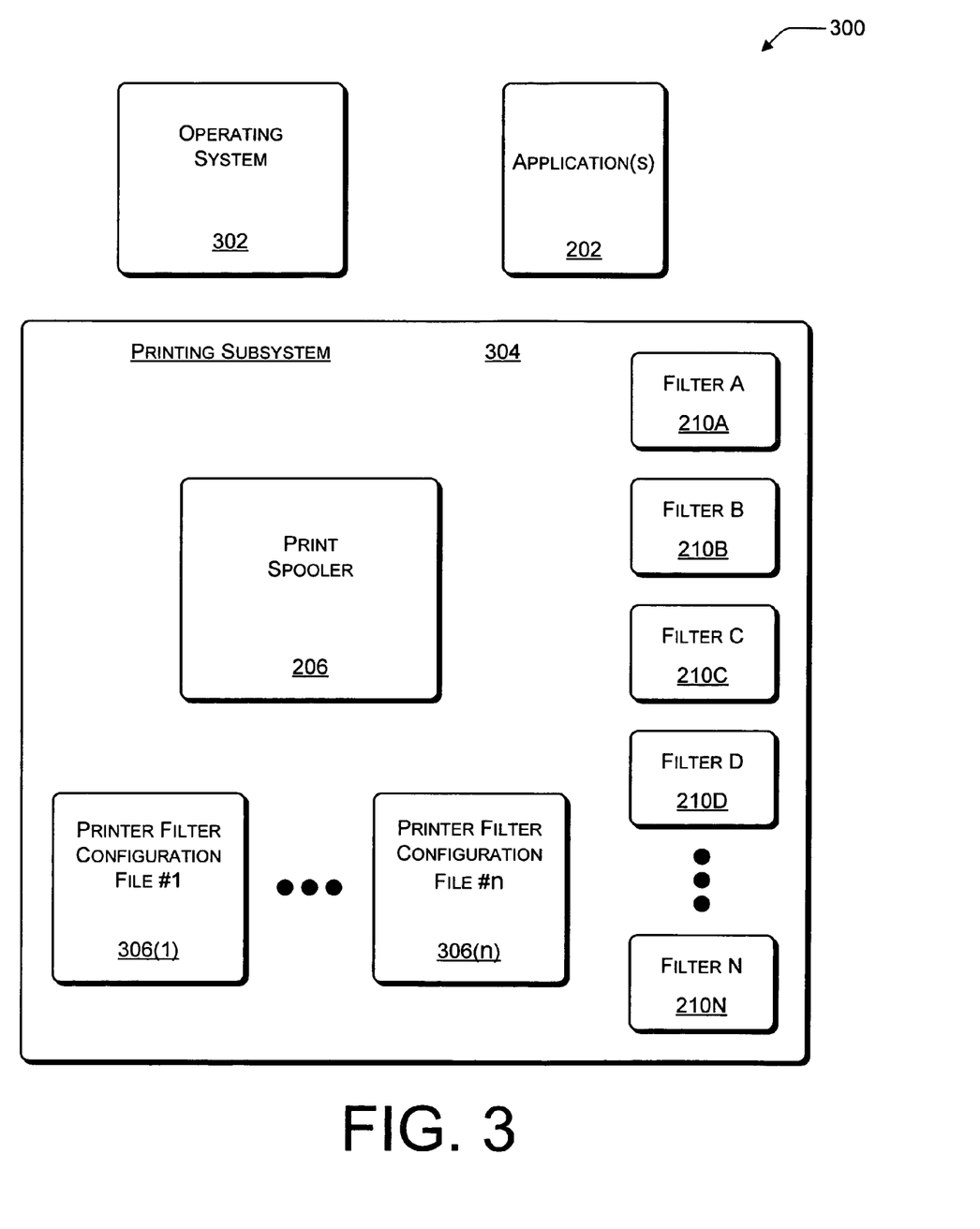
FIG. 3 is a device having an example of a flexible printing subsystem that is capable of establishing and utilizing a printer filter pipeline with a printer filter configuration file.

FIG. 3 is a device 300 having an example of a flexible printing subsystem 304 that is capable of establishing and utilizing a printer filter pipeline with a printer filter configuration file 306. Although not explicitly illustrated in FIG. 3, device 300 may include at least one processor, one or more media, input/output (I/O) interface(s), and other hardware/software/firmware. An example device and operating environment that is capable of implementing at least one aspect of printer filter configuring is described further herein below with particular reference to FIG. 7 in a section entitled "Example Operating Environment for Computer or Other Device".

As illustrated, device 300 includes an operating system 302, one or more applications 202, and printing subsystem 304. Optionally, printing subsystem 304 may be fully or partially part of and/or integrated with operating system 302. Alternatively, printing subsystem 304 may run on top of or along side of operating system 302.

In a described implementation, printing subsystem 304 includes print spooler 206 and "N" printer filters 210(1 ... N), with "N" comprising an integer of one or greater. Filter A 210A, filter B 210B, filter C 210C, filter D 210D ... filter N 210N are specifically shown in FIG. 3. However, one, two, three, or more printer filters 210 may be present at device 300.

Printing subsystem 304 also includes "n" printer filter configuration files 306. Specifically, printer filter configuration file #1 306(1) ... printer filter configuration file #n 306(n) are stored at device 300 as part of printing subsystem 304. Although no one-to-one correspondence need be established or otherwise exist, in a described implementation there is a respective printer filter configuration file 306(1 ... n) for each installed printer 208(1 ... n).

In a described implementation, each printer filter configuration file 306 includes sufficient information to enable printing subsystem 304 to establish a printer filter pipeline 212 (of FIG. 2) as well as to utilize the established printer filter pipeline 212 in a print job. For example, a printer filter configuration file 306 may identify the printer filters 210 of a given printer filter pipeline 212, may enumerate input and output interfaces for the individual printer filters 210, may stipulate an order for the printer filters 210 of the given printer filter pipeline 212, and so forth. An example printer filter configuration file 306 is described further herein below with particular reference to FIG. 4.

Printer filters 210A-210N, individually and in groups of two or more, may provide any printing enhancement(s) and/or perform any language or format conversion(s). Eight examples of printer filters 210A-210N are described below. First, a printer filter 210 may be a watermark filter that underlays a specified watermark on at least one page of a print job. Second, a printer filter 210 may be a selector filter that selects between or among different available versions of a current print job. For instance, different versions may be based on language (e.g., English, French, or German), on colors (e.g., grayscale versus color, color depth, etc.), and so forth.

Third, a printer filter 210 may be an N-up filter that places "N" logical pages on each printed sheet. Fourth, a printer filter 210 may be a binding filter that changes directional orientation of printed pages depending on what type of binding (e.g., book form, top binding, side binding, etc.) is intended. Fifth, a printer filter 210 may be a transparency filter that ensures that color mixtures are appropriate to properly reflect the transparency of objects as well as the relative depths of respective objects.

Sixth, a printer filter 210 may be a renderer filter that performs a conversion from a computer format to a printer language. For instance, a conversion from EMF to either Postscript or printer control language (PCL) may be performed. Seventh, a printer filter 210 may be an accounting filter that tracks a number of printed pages and may assign each printed page to a different category (e.g., personal/employee, customer number, corporate number, file number, etc.). Eighth, a printer filter 210 may be a color enhancement filter that tunes color combinations. One or more other printer filter 210 realizations may alternatively be implemented.

Figure 4:
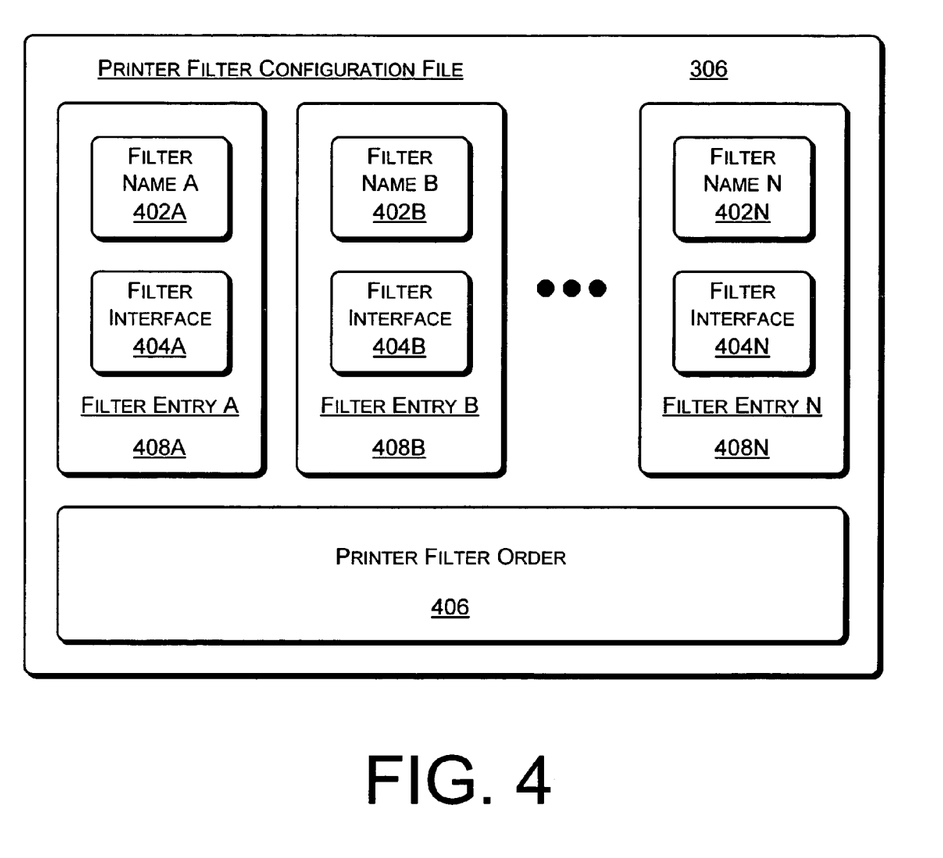
FIG. 4 is a block diagram example of a printer filter configuration file.

FIG. 4 is a block diagram example of a printer filter configuration file 306. Printer filter configuration file 306 is used by printing subsystem 304 (of FIG. 3) to establish a printer filter pipeline 212 and/or to utilize a constructed printer filter pipeline 212. As illustrated, printer filter configuration file 306 is directed to "N" printer filters 210 as indicated by associated "N" printer filter entries 408. Specifically, printer filter configuration file 306 is directed to printer filter A 210A, printer filter B 210B . . . printer filter N 210N as indicated by associated printer filter entry A 408A, printer filter entry B 408B . . . printer filter entry N 408N, respectively.

The printer filter configuration information for the "N" printer filters 210A-210N may be arranged and/or organized in any manner. In a described implementation, however, filter names 402 and filter interfaces 404 are arranged together with regard to their respective printer filters 210 in respective printer filter entries 408. As illustrated, printer filter entry A 408A includes a filter name A 402A and a filter interface 404A, printer filter entry B 408B includes a filter name B 402B and a filter interface 404B . . . and printer filter entry N 408N includes a filter name N 402N and a filter interface 404N.

Printer filter configuration file 306 also includes a printer filter order 406. The printer filter order information for printer filter order 406 includes a stipulated order in which printer filters 210A-210N are to be established for a printer filter pipeline 212 that corresponds to the printer filter configuration file 306. Printer filter order 406 may be realized in any of many possible manners. For example, printer filter order information may be inherently included in printer filter configuration file 306 by the order of filter entries 408. Alternatively, printer filter configuration file 306 may include a field that comprises the printer filter order information of printer filter order 406. An example of a printer filter order 406 and the resulting printer filter pipeline 212 is described further herein below with particular reference to FIG. 5.

It should be noted that a printer filter configuration file 306 need not employ all printer filters 210 that are available on a given device. Similarly, a printer filter order 406 of a given printer filter configuration file 306 need not stipulate all of the printer filters 210 that have an associated filter entry 408 in that given printer filter configuration file 306. Although printer filter configuration file 306 may be realized in any manner, in a described implementation printer filter configuration file 306 is realized as an assembly (in managed code environments) or as a dynamic link library (.dll) file (in traditional or pre-compiled code environments). An example of a printer filter configuration file 306 that is in an extensible markup language (XML) format is presented below after the description of FIG. 6.

Figure 5:
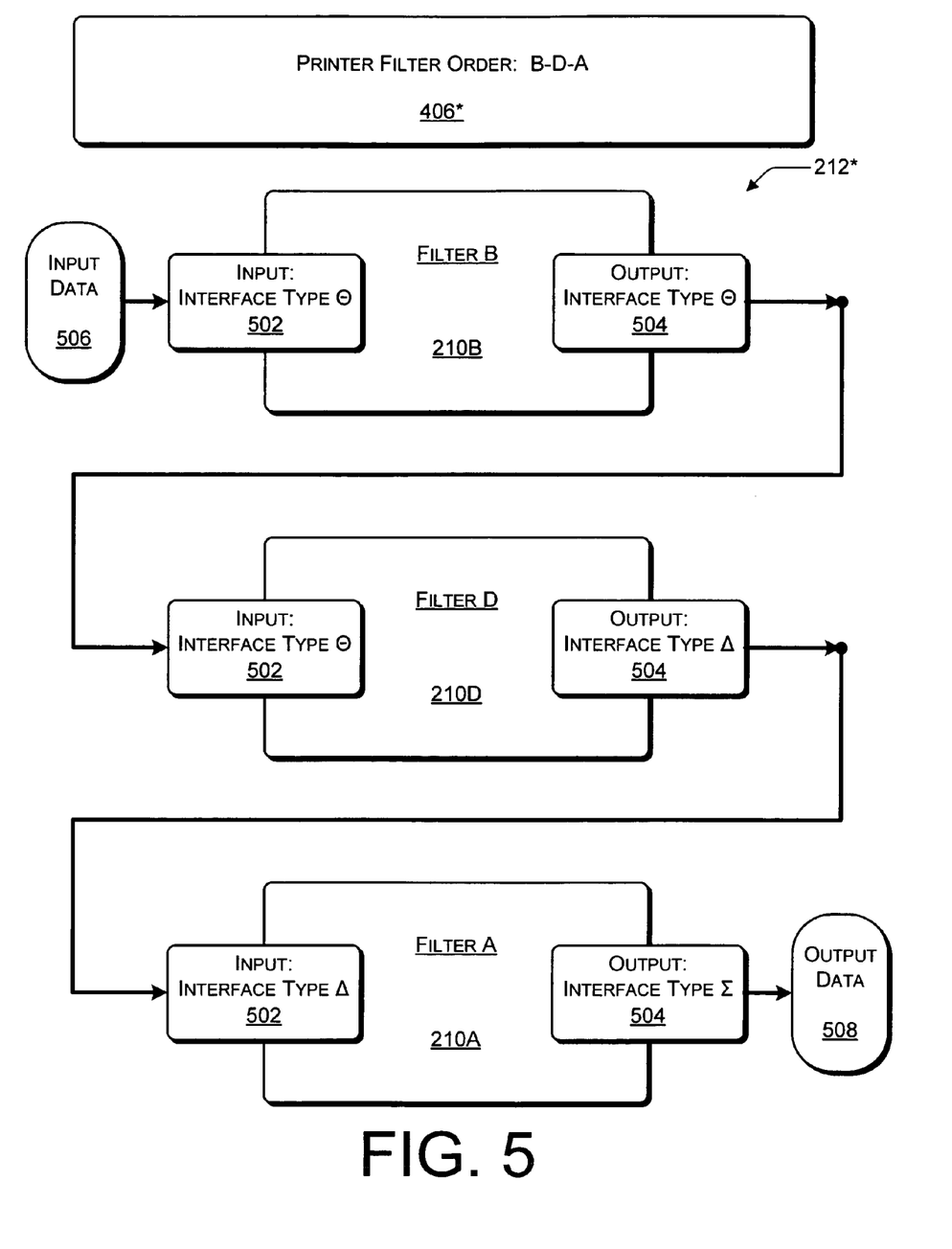
FIG. 5 is a block diagram example of a printer filter pipeline having three printer filters, the printer filter pipeline established in accordance with a printer filter configuration file.

FIG. 5 is a block diagram example of a printer filter pipeline 212* having three printer filters 210 in which printer filter pipeline 212* is established in accordance with a printer filter configuration file having a printer filter order 406*. Filter order 406* stipulates an order of printer filters 210 for printer filter pipeline 212*. In this example, the stipulated filter order is "B-D-A". Hence, printer filter pipeline 212* is to be established or constructed in the following order: (1) printer filter B 210B, (2) printer filter D 210D, and (3) printer filter A 210A.

As illustrated, printer filter pipeline 212* includes three filters: (1) printer filter B 210B, (2) printer filter D 210D, and (3) printer filter A 210A. Each printer filter 210 includes an input interface 502 and an output interface 504. As printable file 204 is applied to printer filter pipeline 212* and as it traverses each printer filter 210, each printer filter 210 receives printable file 204 at its input interface 502 and forwards a filtered printable file 204 at its output interface 504.

Printer filter B 210B has an input interface 502 of type $\Theta$ and an output interface 504 also of type $\Theta$. Printer filter D 210D has an input interface 502 of type $\Theta$ and an output interface 504 of type $\Delta$. Printer filter A 210A has an input interface 502 of type $\Delta$ and an output interface 504 of type $\Sigma$. With reference also to FIG. 4, each filter interface 404 can enumerate both an input interface 502 and an output interface 504. Examples of printer filter interface types include, but are not limited to: a stream interface type, a visual tree (VT) interface type, a fixed document interface type, a document sequence interface type, a fixed page interface type, other present and future interface types, some combination thereof, and so forth.

For a printable file 204 to traverse printer filter pipeline 212*, mating interfaces between any two adjacent printer filters 210 are matched. Two interface types match if they are identical or known to be compatible such that data formatted as one interface type can be understood and correctly processed as data formatted as the other interface type. By way of example only, an interface type of an output interface 504 may be a subset of an interface type of an input interface 502 and still be compatible.

As shown, the mating interfaces (i) between printer filter B 210B and printer filter D 210D and (ii) between printer filter D 210D and printer filter A 210A do match. More specifically, the output interface 504 of printer filter B 210B and the input interface 502 of printer filter D 210D are both of an interface type $\Theta$. Also, the output interface 504 of printer filter D 210D and the input interface 502 of printer filter A 210A are both of an interface type $\Delta$. Consequently, a printable file 204 may be passed (i) between printer filter B 210B and printer filter D 210D and (ii) between printer filter D 210D and printer filter A 210A.

For printer filter pipeline 212* overall, printable file 204 is applied thereto as input data 506. Input data 506 represents printable file 204 in a computer-language-compatible format. As printable file 204 traverses each respective filter 210 from its associated input interface 502 to its associated output interface 504, printable file 204 is filtered in some manner, as is described herein above with particular reference to FIG. 3. After traversing the printer filters 210 of printer filter pipeline 212*, printable file 204 is produced as output data 508. Thus, output data 508 represents printable file 204 in a printerlanguage-compatible format after filtering. Printable file 204 as output data 508 may therefore be forwarded by print spooler 206 (of FIGS. 2 and 3) to a printer 208.

Figure 6:
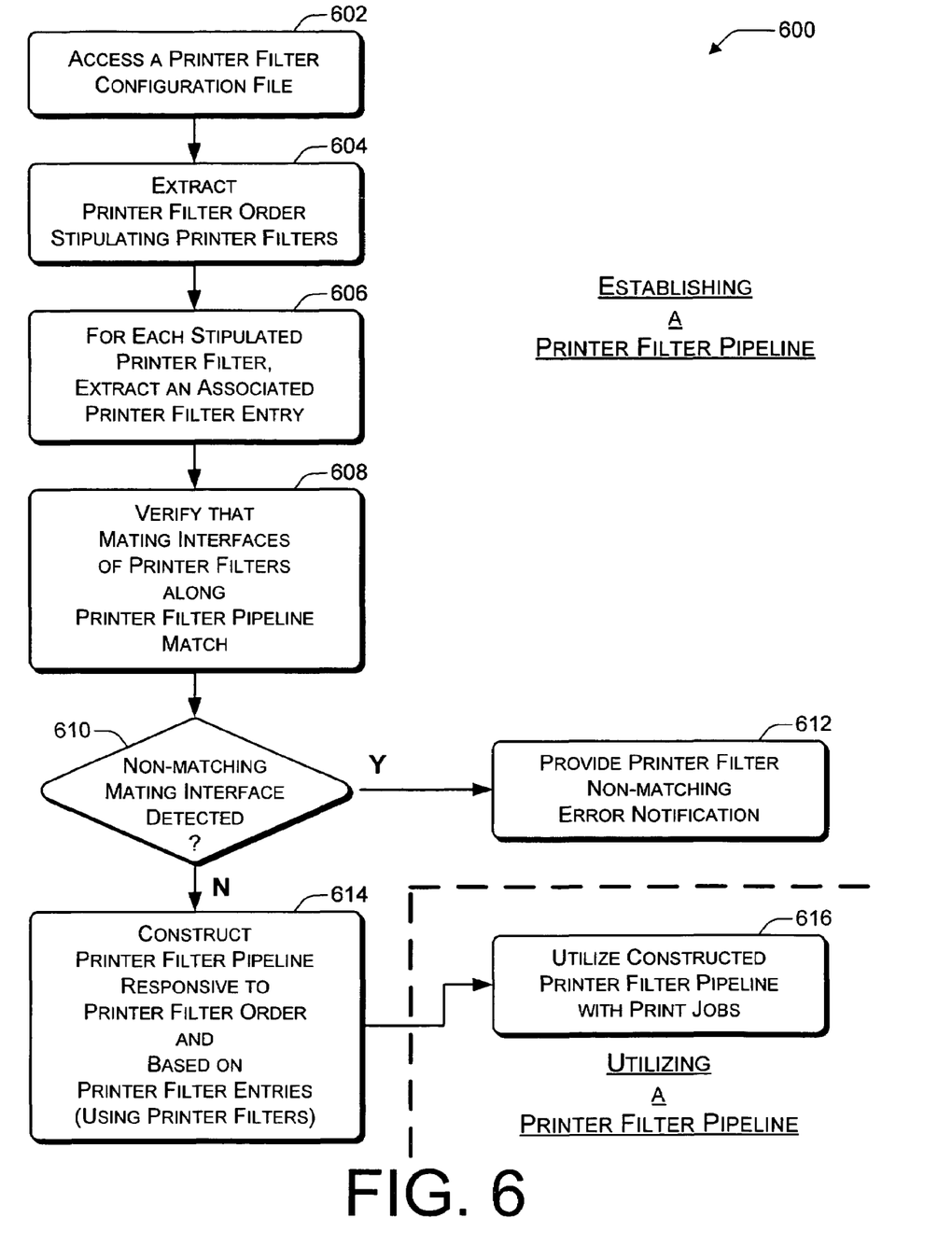
FIG. 6 is a flow diagram that illustrates an example of a method for establishing a printer filter pipeline in accordance with a printer filter configuration file.

FIG. 6 is a flow diagram 600 that illustrates an example of a method for establishing a printer filter pipeline in accordance with a printer filter configuration file. Flow diagram 600 is also directed to utilizing a printer filter pipeline. Flow diagram 600 includes eight (8) blocks 602-616. Although the actions of flow diagram 600 may be performed in other environments and with a variety of hardware and software combinations, FIGS. 2-5 are used in particular to illustrate certain aspects and examples of the method. By way of example only, the actions of flow diagram 600 may be performed by a printing subsystem 304 of a device 300.

At block 602, a printer filter configuration file is accessed. For example, a printer filter configuration file 306 may be accessed. At block 604, a printer filter order that stipulates an order for printer filters is extracted. For example, a printer filter order 406 that stipulates an order for printer filters 210 for a printer filter pipeline 212 may be extracted (i) from a (e.g., separate) field of printer filter configuration file 306 or (ii) by analysis of an instrinsic order of printer filter entries 408 of printer filter configuration file 306.

At block 606, for each stipulated printer filter, an associated printer filter entry is extracted. For example, for each printer filter 210 that is stipulated in printer filter order 406, an associated printer filter entry 408 may be extracted from printer filter configuration file 306. Each extracted printer filter entry 408 may include an identified printer filter name 402 and an enumerated printer filter interface 404. Each enumerated printer filter interface 404 may include an input interface 502 and an output interface 504.

At block 608, it is verified that mating interfaces of the stipulated printing filters along the printer filter pipeline match. For example, it may be verified that mating interfaces of adjacent printer filters 210 of printer filter pipeline 212 match. More specifically, it may be verified that an interface type of an output interface 504 for each printer filter 210 is compatible with an interface type of an input interface 502 for a succeeding printer filter 210 in printer filter pipeline 212.

At block 610, it is determined if a non-matching mating interface is detected based on the verification. For example, it may be determined if two mated interfaces 504/502 of adjacent printer filters 210 are detected to be non-matching during the verification. If yes, a non-matching mating interface is detected, then at block 612 a non-matching printer filter error notification is provided. For example, printing subsystem 304 in conjunction with operating system 302 may provide an error notification to a user that indicates an incompatible printer filter pipeline 212 has been stipulated by the order of printer filters 210 in printer filter order 406.

If, on the other hand, no non-matching mating interface is detected (as determined at block 610), then at block 614 a printer filter pipeline is constructed (using printer filters) responsive to a printer filter order and based on printer filter entries. For example, printer filter pipeline 212 may be constructed using printer filters 210 responsive to printer filter order 406 and based on printer filter entries 408 of printer filter configuration file 306. For instance, with a printer filter order 406* (of FIG. 5), a printer filter pipeline 212* may be constructed.

At block 616, the constructed printer filter pipeline is utilized with one or more print jobs. For example, a printable file 204 may be applied to printer filter pipeline 212 such that printer filters 210 thereof filter printable file 204 so that printable file 204 is converted from a computer-language format to a printer-language format and optionally enhanced.

The actions of flow diagram 600 may be performed in many different alternative orders. For example, actions of individual different blocks 602-616 may be performed fully or partially simultaneously. As another example, the action(s) of block 614 may be performed prior to the action(s) of block 608 and 610.

Printer Filter Configuration File Example in an XML Format

An example of a printer filter configuration file 306 is presented below. This example is a file that is formatted in XML. This XML-formatted example printer filter configuration file 306 has been somewhat tuned to correspond to the example of FIG. 5. If there is no separate field for printer filter order 406*, the "<FilterOrder>" section may be omitted and the order may be inferred from the filter order listing. In practice, a first filter 210 of a particular printer filter pipeline 212 that has a "FilterDataInReader" being "ComputerLanguageCompatibleFileReader" may be the only filter 210 of that particular printer filter pipeline 212 that has a given "FilterDataTypeIn".

```
<?xml version="_._"?>
<PrinterFilterConfiguration xmlns:xsd="http://www.w3.org/YEAR/XMLSchema">
    <Configuration ConfigurationId="ExampleIDNo- . . . " ConfigurationVersion="#">
        <Filters>
            <FilterInfo FilterName="Filter B"
                FilterInterface="Interface Type X"
                FilterDataTypeIn="Data Type θ"
                FilterDataInReader="ComputerLanguageCompatibleFileReader"
                FilterDataOutType="Data Type θ"
                FilterDataOutWriter="IntermediateWriter"
                PublicKeyToken ="########"
                Version="_._._._"
                Culture="neutral" />
            <FilterInfo FilterName="Filter D"
                FilterInterface="Interface Type Y"
                FilterDataTypeIn="Data Type θ"
                FilterDataInReader="IntermediateReader"
                FilterDataOutType="Data Type Δ"
                FilterDataOutWriter="IntermediateWriter"
                PublicKeyToken ="########"
                Version="_._._._"
                Culture="neutral" />
```

-continued

```
    <FilterInfo FilterName="Filter A"
        FilterInterface="Interface Type Z"
        FilterDataTypeIn="Data Type Δ"
        FilterDataInReader="IntermediateReader"
        FilterDataOutType="Data Type Σ"
        FilterDataOutWriter="PrinterLanguageCompatibleFileWriter"
        PublicKeyToken ="########"
        Version="_._._._"
        Culture="neutral" />
    </Filters>
    <FilterOrder>
        <FilterInfoReference FilterName="Filter B"/>
        <FilterInfoReference FilterName="Filter D"/>
        <FilterInfoReference FilterName="Filter A"/>
    </FilterOrder>
    </Configuration>
</PrinterFilterConfiguration>
```

The devices, actions, aspects, features, algorithms, procedures, modules, components, etc. of FIGS. 1-6 are illustrated in diagrams that are divided into multiple blocks. However, the order, interconnections, interrelationships, layout, etc. in which FIGS. 1-6 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for printer filter configuration. Furthermore, although the description herein includes references to specific implementations (including a general device of FIG. 7), the illustrated and/or described implementations can be implemented in any suitable hardware, software, firmware, or combination thereof and using any suitable file format(s); computer, printer, or other language format(s); printer filter configuration data structure(s); printer filter interface type(s); print spooler mechanism(s); printing subsystem architecture(s); and so forth.

Example Operating Environment for Computer or Other Device

Figure 7:
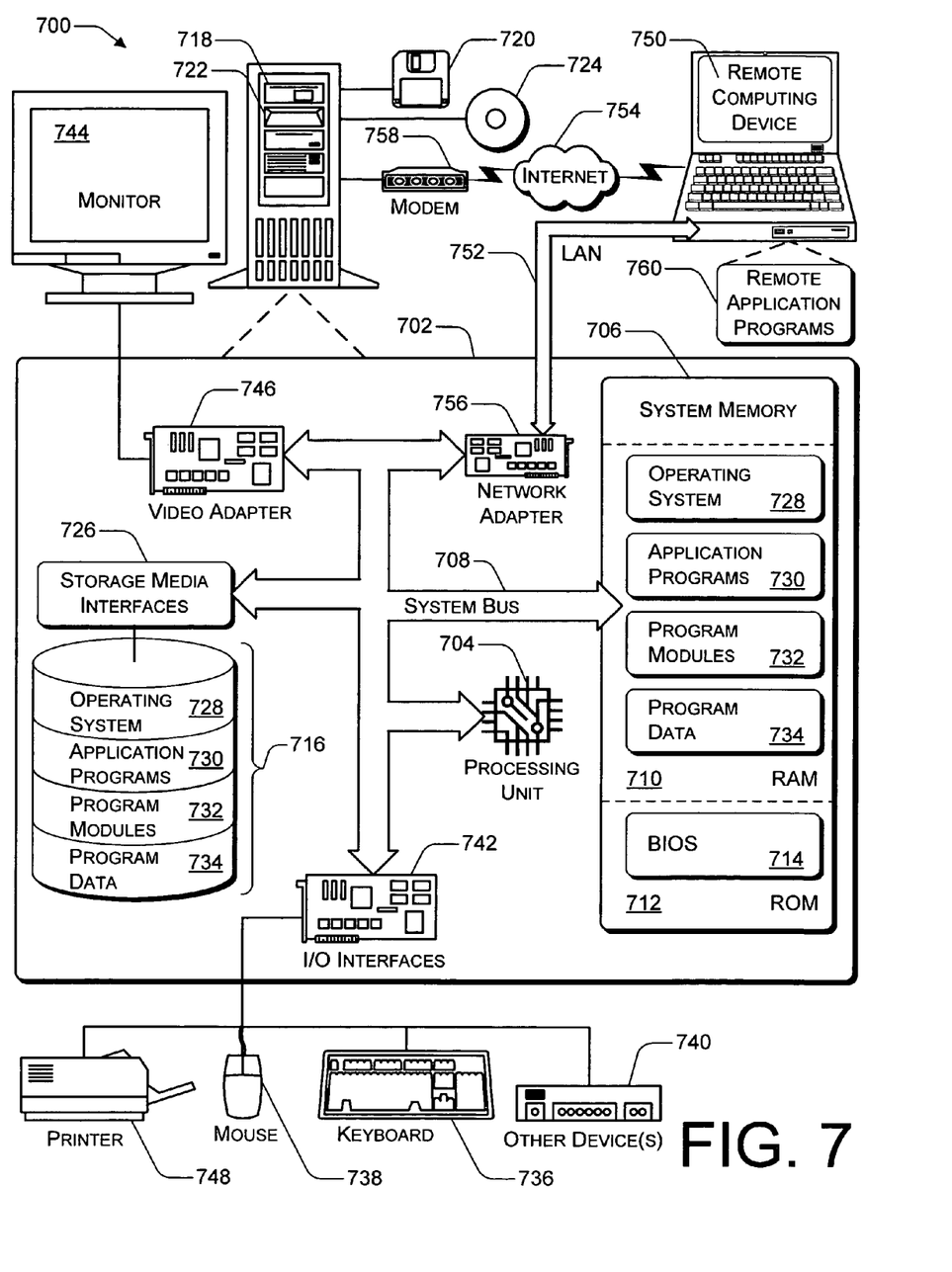
FIG. 7 illustrates an example of a computing (or general device) operating environment that is capable of (wholly or partially) implementing at least one aspect of printer filter configuration as described herein.

FIG. 7 illustrates an example computing (or general device) operating environment 700 that is capable of (fully or partially) implementing at least one system, device, apparatus, component, arrangement, protocol, approach, method, procedure, media, API, some combination thereof, etc. for printer filter configuration as described herein. Operating environment 700 may be utilized in the computer and network architectures described below.

Example operating environment 700 is only one example of an environment and is not intended to suggest any limitation as to the scope of use or functionality of the applicable device (including computer, network node, entertainment device, mobile appliance, general electronic device, etc.) architectures. Neither should operating environment 700 (or the devices thereof) be interpreted as having any dependency or requirement relating to any one or to any combination of components as illustrated in FIG. 7.

Additionally, printer filter configuration realizations may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for printer filter configuring may be described in the general context of processor-executable instructions. Generally, processor-executable instructions include routines, programs, protocols, objects, interfaces, components, data structures, etc. that perform and/or enable particular tasks and/or implement particular abstract data types. Realizations for printer filter configuring, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 700 includes a general-purpose computing device in the form of a computer 702, which may comprise any (e.g., electronic) device with computing/processing capabilities. The components of computer 702 may include, but are not limited to, one or more processors or processing units 704, a system memory 706, and a system bus 708 that couples various system components including processor 704 to system memory 706.

Processors 704 are not limited by the materials from which they are formed or the processing mechanisms employed therein. For example, processors 704 may be comprised of semiconductor(s) and/or transistors (e.g., electronic integrated circuits (ICs)). In such a context, processor-executable instructions may be electronically-executable instructions. Alternatively, the mechanisms of or for processors 704, and thus of or for computer 702, may include, but are not limited to, quantum computing, optical computing, mechanical computing (e.g., using nanotechnology), and so forth.

System bus 708 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of processor-accessible media. Such media may be any available media that is accessible by computer 702 or another (e.g., electronic) device, and it includes both volatile and non-volatile media, removable and non-removable media, and storage and transmission media" with "Computer 702 typically includes a variety of processor-accessible media. Such media may be any available media that is accessible by computer 702 or another (e.g., electronic) device, and it includes both volatile and non-volatile media, removable and non-removable media, and storage media.

System memory 706 includes processor-accessible storage media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD, DVD, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated processor-accessible media provide non-volatile storage of processor-executable instructions, such as data structures, program modules, and other data for computer 702. Although example computer 702 illustrates a hard disk 716, a removable magnetic disk 720, and a removable optical disk 724, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 700.

Any number of program modules (or other units or sets of processor-executable instructions) may be stored on hard disk 716, magnetic disk 720, optical disk 724, ROM 712, and/or RAM 710, including by way of general example, an operating system 728, one or more application programs 730, other program modules 732, and program data 734. These processor-executable instructions may include, for example, one or more printer filter configuration file 306 data structure(s), a program/module for print spooler 206, applications 202 and operating system 302, one or more printer filters 210, a printable file 204, and so forth.

A user may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, video camera, scanner, and/or the like. These and other input devices are connected to processing unit 704 via input/output interfaces 742 that are coupled to system bus 708. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 744 or other type of display device may also be connected to system bus 708 via an interface, such as a video adapter 746. Video adapter 746 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 702 is usually connected to LAN 752 via a network interface or adapter 756. When implemented in a WAN networking environment, computer 702 typically includes a modem 758 or other component for establishing communications over WAN 754. Modem 758, which may be internal or external to computer 702, may be connected to system bus 708 via input/output interfaces 742 or any other appropriate mechanism(s). It is to be appreciated that the illustrated network connections are examples and that other manners for establishing communication link(s) between computers 702 and 750 may be employed.

In a networked environment, such as that illustrated with operating environment 700, program modules or other instructions that are depicted relative to computer 702, or portions thereof, may be fully or partially stored in a remote media storage device. By way of example, remote application programs 760 reside on a memory component of remote computer 750 but may be usable or otherwise accessible via computer 702. Also, for purposes of illustration, application programs 730 and other processor-executable instructions such as operating system 728 are illustrated herein as discrete blocks, but it is recognized that such programs, components, and other instructions reside at various times in different storage components of computing device 702 (and/or remote computing device 750) and are executed by processor(s) 704 of computer 702 (and/or those of remote computing device 750).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. One or more processor-accessible media having at least one physical component, comprising a printer filter configuration data structure, the printer filter configuration data structure comprising:

multiple filter entries;

multiple printer filters, each multiple printer filter entry respectfully associated with one of the multiple filter entries and includes a filter name of the respective printer filter and a filter interface for the respective printer filter, wherein the printer filter configuration data structure stipulates an order for the multiple printer filters to form a printer filter pipeline, wherein the printer filters of the printer filter pipeline enhance printing by utilizing each of the following printer filters: a watermark filter, a selector filter, an N-up filter, a binding filter, a transparency filter, a renderer filter, an accounting filter, and a color enhancement filter, and wherein the printer filter configuration data structure is further to:

verify that mating interfaces of each printer filter along the printer filter pipeline match, the mating interfaces matching when they are identical or compatible, and the mating interfaces being compatible when data formatted as one interface type is understood and correctly processed as data formatted as another interface type;

determine if a non-matching mating interface between at least two printer filters is detected by the verifying; and provide a non-matching printer filter error notification when a non-matching mating interface is detected.

2. The one or more processor-accessible media as recited in claim 1, wherein the printer filter configuration data structure further comprises:

at least one field comprising a listing of filter names that are also present in the multiple filter entries to thereby stipulate the order for the multiple printer filters to form the printer filter pipeline.

3. The one or more processor-accessible media as recited in claim 1, wherein the printer filter configuration data structure stipulates the order for the multiple printer filters to form the printer filter pipeline via an order of the multiple filter entries.

4. The one or more processor-accessible media as recited in claim 1, wherein each filter interface of each filter entry of the multiple filter entries includes an input interface and an output interface.

5. The one or more processor-accessible media as recited in claim 1, wherein mating interfaces between adjacent ones of the multiple printer filters along the printer pipeline are configured to match.

6. The one or more processor-accessible media as recited in claim 1, wherein the multiple filter entries comprise multiple filter entries; and wherein the multiple printer filters, which form the printer filter pipeline, comprise multiple printer filters.

7. The one or more processor-accessible media as recited in claim 1, further comprising a print spooler that is capable of forming the printer filter pipeline in accordance with the printer filter configuration data structure.

8. The one or more processor-accessible media as recited in claim 1, further comprising an application that is adapted to add a new printer filter to the printer filter pipeline at least by adding a new filter entry to the multiple filter entries, the new filter entry associated with the new printer filter and enumerating a filter interface for the new printer filter.

9. A device that is adapted to establish a printer filter pipeline having an arbitrary and configurable number of printer filters in accordance with a printer filter configuration file, wherein the printer filters of the printer filter pipeline enhance printing by utilizing each of the following printer filters: a watermark filter, a selector filter, an N-up filter, a binding filter, a transparency filter, a renderer filter, an accounting filter, and a color enhancement filter, and wherein the device is further to:

verify that mating interfaces of each printer filter along the printer filter pipeline match, the mating interfaces matching when they are identical or compatible, and the mating interfaces being compatible when data formatted as one interface type is understood and correctly processed as data formatted as another interface type;

determine if a non-matching mating interface between at least two printer filters is detected by the verifying; and provide a non-matching printer filter error notification when a non-matching mating interface is detected.

10. The device as recited in claim 9, wherein the arbitrary and configurable number of printer filters comprises multiple printer filters that are identified in the printer filter configuration file.

11. The device as recited in claim 9, wherein the printer filter pipeline accepts a file in a computer-compatible format and produces a file in a printer-compatible language.

12. The device as recited in claim 9, wherein the device comprises:

the printer filter configuration file; the printer filter configuration file identifying the printer filters, stipulating an order of the identified printer filters for the printer filter pipeline, and enumerating filter interfaces of the identified printer filters.

13. A method, to be implemented by a printing device having one or more printer drivers, comprising:

extracting from a printer filter configuration file a printer filter order that stipulates an order of printer filters for a printer filter pipeline;

extracting from the printer filter configuration file at least part of an associated printer filter entry for each stipulated printer filter,     wherein the extracting from the printer filter configuration file at least part of an associated printer filter entry further comprises extracting a printer filter interface for each associated stipulated printer filter, the printer filter interface enumerating at least one data type that is compatible with the associated stipulated printer filter;

verifying that mating interfaces of each stipulated printer filter along the printer filter pipeline match, the mating interfaces matching when they are identical or compatible, the mating interfaces being compatible when data formatted as one interface type is understood and correctly processed as data formatted as another interface type;

determining if a non-matching mating interface between at least two printer filters is detected by the verifying;

providing a non-matching printer filter error notification when a non-matching mating interface is detected;

constructing the printer filter pipeline responsive to the printer filter order and based on the at least part of the associated printer filter entry for each stipulated printer filter; and     utilizing the constructed printer filter pipeline and transmitting one or more printable files to the printing device.

14. The method as recited in claim 13, wherein the extracting from the printer filter configuration file at least part of an associated printer filter entry comprises:

extracting a printer filter name for each associated stipulated printer filter.

15. The method as recited in claim 13, wherein the extracting a printer filter interface for each associated stipulated printer filter comprises:

extracting an input interface type and an output interface type for each associated stipulated printer filter.

16. The method as recited in claim 13, wherein the verifying comprises:

comparing an interface type of an output interface of one printer filter with an interface type of an input interface of a succeeding printer filter.

* * * * *